United States Patent [19]

Winter et al.

[11] Patent Number: 4,744,612

[45] Date of Patent: * May 17, 1988

[54] FASTENER

[75] Inventors: Russell K. Winter, Crownsville; Thomas D. Harvey, Rockville; Nedim Savas, Bethesda; Richard S. Kain, Woodbine, all of Md.

[73] Assignee: Russell William, Ltd., Odenton, Md.

[*] Notice: The portion of the term of this patent subsequent to Mar. 17, 2004 has been disclaimed.

[21] Appl. No.: 20,092

[22] Filed: Feb. 27, 1987

Related U.S. Application Data

[63] Continuation-in-part of Ser. No. 629,515, Jul. 10, 1984, Pat. No. 4,650,261.

[51] Int. Cl.⁴ ............................................... A47F 3/12
[52] U.S. Cl. ........................................ 312/140; 24/458; 108/111; 211/186; 211/189; 312/263; 403/289
[58] Field of Search ............... 24/458, 336, 573, 590; 312/140, 263; 108/107, 111, 154; 403/397, 289, 291, 315, 316; 211/186, 189

[56] References Cited

U.S. PATENT DOCUMENTS

| 642,875 | 2/1900 | Paulle | 312/140 |
|---|---|---|---|
| 820,438 | 5/1906 | Plym | 312/140 X |
| 2,654,131 | 10/1953 | Poupitch | 24/458 X |
| 3,279,876 | 10/1966 | St. Cyr | 108/107 X |
| 3,673,643 | 7/1972 | Kindell | 24/458 |
| 3,806,124 | 4/1974 | Ippen et al. | 108/111 X |
| 3,913,289 | 10/1975 | Recker | 312/140 X |
| 4,114,966 | 9/1978 | Schneider | 312/140 X |
| 4,126,230 | 11/1978 | Tyson et al. | 211/189 X |
| 4,223,966 | 9/1980 | Winters | 312/140 |
| 4,444,321 | 4/1984 | Carlstrom | 211/186 |
| 4,537,539 | 8/1985 | Borchardt | 24/590 X |
| 4,650,261 | 3/1987 | Winter et al. | 312/140 |

FOREIGN PATENT DOCUMENTS

| 954351 | 9/1974 | Canada | 24/336 |
|---|---|---|---|
| 399827 | 7/1909 | France | 312/140 |
| 1064123 | 5/1954 | France | 312/140 |
| 666765 | 9/1964 | Italy | 108/107 |
| 554162 | 9/1974 | Switzerland | 312/140 |
| 531594 | 1/1941 | United Kingdom | 24/573 |

Primary Examiner—Peter A. Aschenbrenner
Assistant Examiner—Thomas A. Rendos

[57] ABSTRACT

An improved fastener (10) is provided for releasably coupling a side panel member (16) having opposing internal and external surfaces (26 and 28) to a display panel member (18). The improved fastener (10) may be inserted into through openings (24) in side panel members (16) from internal a display system (14) or external thereto. Improved fastener (10) is formed in generally one-piece molded formation and includes a base portion (30), a fastener central portion (32), and a pair of longitudinally extending upper and lower arm members (34 and 36) respectively. The improved fastener (10) includes a chamfered surface (40) for the base portion (30) as well as a chamfered lower section (44) for the central portion (32) which allows insert of improved fastener (10) in a reversible longitudinal direction (12) when taken with respect to the side panel member (16). The central portion (32) of the improved fastener (10) matingly engages the interior wall (42) of the side panel member through opening (24) and snappingly is inserted into a display panel member (18) within a through opening (56) formed therethrough.

19 Claims, 1 Drawing Sheet

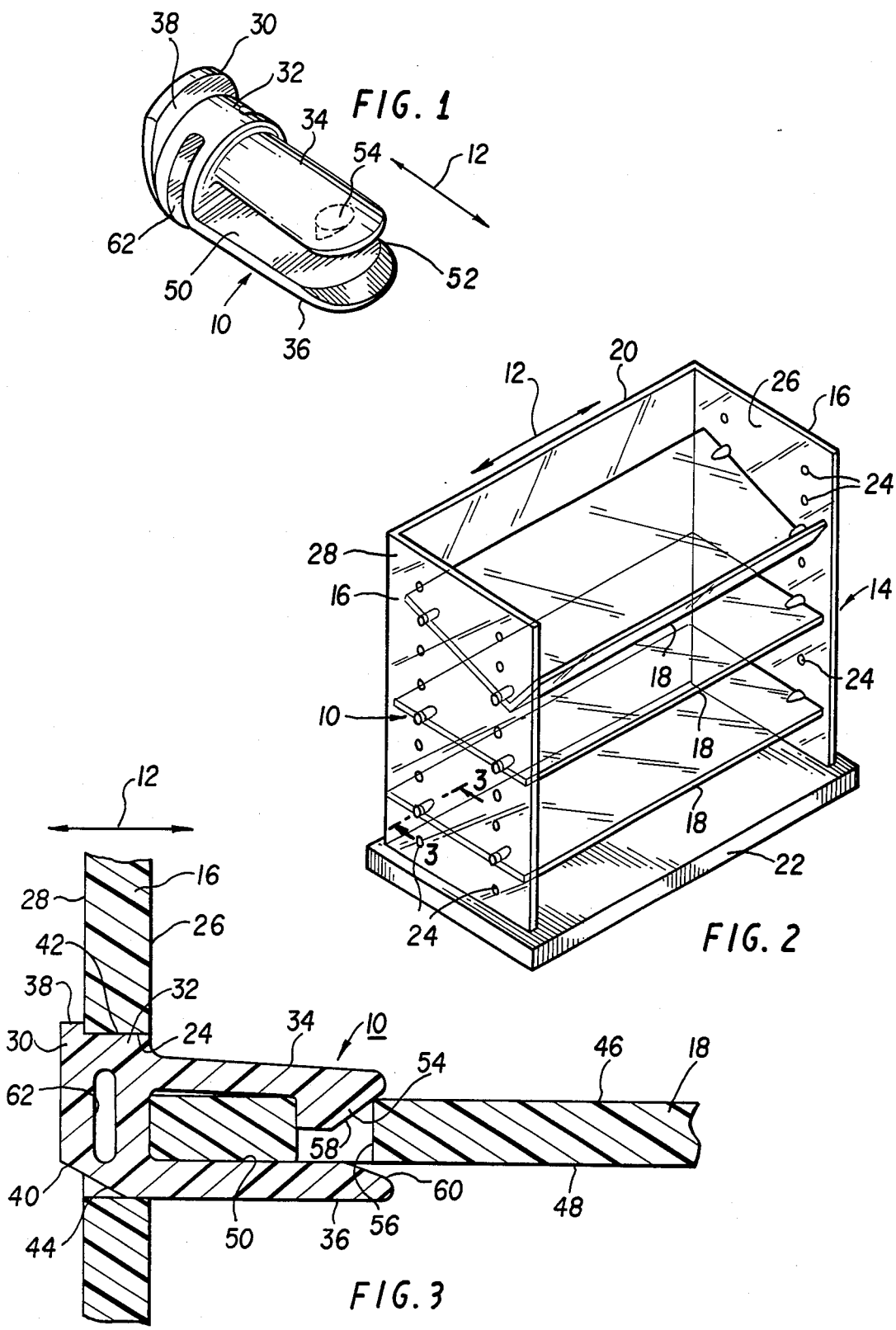

FASTENER

RELATED PATENT APPLICATIONS

This patent application is a Continuation-in-Part of Ser. No. 629,515 filed on July 10, 1984 entitled "Fastener for Coupling Panels", U.S. Pat. No. 4,650,261.

BACKGROUND OF THE INVENTION

1. Field of the Invention

This invention directs itself to improved fasteners for coupling panel members. In particular, this invention relates to fastening systems for fastening generally directed orthogonally oriented panel members each to the other in a releasable coupling mode. Still further, this invention relates to a fastening system which frictionally engages the inner walls of a through opening formed in a side panel member and locks the side panel member to a substantially orthogonally directed display panel member. Still further, this invention directs itself to an improved fastener which includes a chamfered surface to allow insert of the improved fastener in a reversible longitudinal direction within a through opening formed in a side panel. Additionally, this invention relates to a fastener which includes a pair of arm members defining an inclined insert passageway within which a panel member is slidingly engaged. Further, this invention relates to a fastener where sliding engagement of a panel member is followed by a snapping interfit of the fastener with an opening formed in the panel member. More in particular, this invention relates to a fastening system which includes a base portion defining a lug member upper section for engaging an external surface of a side panel member to bear the force loading applied thereto by insert of a display panel member within the improved fastener. Additionally, this invention relates to a fastening system which is formed of a plastic-like composition in a molded one-piece formation which clampingly engages a panel member between opposing resiliently formed arm members.

2. Prior Art

Fasteners for releasably coupling panel members each to the other are well known in the art. However, fastener systems for coupling generally orthogonally oriented panel members each to the other in a snapping relationship utilizing both a snapping engagement and a frictional interface has not been fully found in the prior art.

The best prior art known to Applicants include U.S. Pat. Nos. 642,875; 820,438; 2,654,131; 3,279,876; 3,673,643; 3,806,124; 3,913,289; 4,114,966; 4,126,230; 4,223,966; 4,444,321; 4,072,374; 2,172,302; 3,034,615; 2,084,554; 3,561,068; 2,644,213; 3,345,706; 3,393,431; 3,412,437; 3,038,223; and, 3,809,799. Additionally, Applicants know of United Kingdom patent No. 531594; Canadian patent No. 954351; French patent Nos. 399827 and 1064123; Italian patent No. 666765; and, Swiss patent No. 554162.

In some prior art systems such as U.S. Pat. No. 4,444,321, there is provided bracket structures which include both male and female clips. In such systems, there are bifurcations provided however, such are parallel and generally have the same cross-sectional area. Such systems do not provide for the coupling of the subject invention concept combination of elements in that they do not provide a base portion having a diameter greater than a predetermined diameter or contour of a side panel member. Additionally, the bifurcations of such prior art systems provide for parallel legs and do not appear to provide for an inclined clamping insert type of fastening as is provided in the instant concept.

In other prior art systems such as that shown in British patent No. 531594, there is provided a spring clip having a pair of opposing inclined arms joined at a bent portion. Such prior systems do not provide for base portions of a fastener having an extended lug member upper section for particular coupling to a side panel member through an opening of predetermined contour formed therethrough. Additionally, such do not provide for a central portion of a fastener for interfacing and frictionally engaging the through opening interior walls of a side panel member as is necessary to the subject invention concept system.

In other prior art systems such as that shown in U.S. Pat. No. 4,072,374, such provides for side fastener clips for plate members. However, these systems although including resilient parallel legs mounted on a base, do not provide the leg members to be inclined each with respect to the other, as is necessary to the subject fastener system which allows for a snap clip type coupling.

Other prior art devices and systems direct themselves to various complicated fastening devices which increase the manufacturing and capital costs associated with producing such fasteners.

SUMMARY OF THE INVENTION

An improved fastener is provided for releasably coupling a side panel member having opposing internal and external surfaces to a display panel member. The side panel member has a side panel member through opening of predetermined contour formed therethrough. The improved fastener includes a base portion defining a lug member upper section extending beyond the side panel through opening contour when the fastener operatively engages the side panel and the display panel members. The lug member upper section contiguously interfaces with the external surface of the side panel member and the base portion includes a chamfered lower section for insert of the fastener through the side panel member through opening in a reversible longitudinal direction. A central portion of the fastener is provided and is secured to the base portion. At least a portion of the fastener central portion has a predetermined contour for matingly engaging a portion of an inner wall of the panel member through opening. There is further included a pair of longitudinally extending arm members which are fixedly mounted to the fastener central portion and adapted to clampingly engage the display panel member on opposing surfaces thereof. One of the longitudinally extending arm members extends substantially normal a plane defining the side panel member with the other longitudinally extending arm member being inclined with respect to the plane of the side panel member defining an inclined display panel member insert passageway. The insert passageway has a longitudinally directed planar lower surface for slidable insert of the display panel member in a substantially horizontal plane.

BRIEF DESCRIPTION OF THE DRAWINGS

FIG. 1 is a perspective view of the improved fastener;

FIG. 2 is a perspective view of the improved fastener coupling a side panel of a display system to a display panel member; and, FIG. 3 is a sectional view of the improved fastener in operative engagement and partially cut-away taken along the Section Line 3—3 of FIG. 2.

DESCRIPTION OF THE PREFERRED EMBODIMENTS

Referring now to FIGS. 1-3, there is shown improved fastener 10 for use in the construction of display system 14 as is shown in FIG. 2. Although adaptable to a number of domestic and commercial uses, improved fastener 10 is particularly useful for coupling display side panel members 16 to display panel members 18, as is shown. When in use in the construction of display system 14, the objects and purposes of improved fastener 10 is to provide a simple construction system which provides structural integrity for display system 14 to allow various objects to be mounted on display panel members 18. When in use in construction of display systems 14, it is important that aesthetic effects be maintained and improved fastener 10 as herein described provides for an unobtrusive coupling mechanism which is of simple formation and may be easily removed from a coupling mode of operation. Still further, improved fastener 10 of the subject invention concept allows for insert of improved fasteners 10 into a couping mode in reversible longitudinal direction 12. Thus, improved fastener 10 may be inserted into side panel members 16 from internal display system 14 or external display system 14. In general, this may be an important consideration when display systems 10 are mounted next to each other or adjacent to a wall where it would be difficult to insert improved fasteners 10 from one or the other side.

In overall concept, improved fastener 10 is useful to provide a substantially rigid coupling between side panel members 16 and display panel members 18 in a manner which allows for display panel members 18 to be re-positioned and/or re-oriented dependent upon the wishes of the user and the particular objects being mounted on display panel members 18. By allowing re-orientation in a simple manner, the entire aesthetic effect of display system 14 may be changed in a simple, yet effective manner by the user.

Although of particular use in display system 14, it is to be understood that improved fastener 10 may be utilized in connection with a releasable coupling of panel members each to the other in a wide variety of structural environments which in some cases may be remote to the display system art. Thus, improved fastener 10 may be utilized in both commercial and domestic applications wherever structural integrity is to be maintained between panel couplings.

A particular use for improved fastener 10 is shown in FIG. 2 which provides for display system 14 having side panels 16, display panel members 18, and rear panel wall 20. The overall construction frame including side panel members 16 and rear panel wall 20 are mounted on base member 22 which interfaces with an external base surface.

Although not important to the inventive concept as herein described, side panel members 16, display panel members 18, rear panel walls 20 and base member 22 may be formed of plastic material composition, wood, metal, or some like material, with the only restriction on the material composition being that such be of sufficient structural integrity to maintain the objects contained therein in a stable manner. Further, as shown in FIG. 2, improved fasteners 10 extend through side panel members 16 passing through openings 24 formed in side panel members 16 for coupling side panel members 16 to display panel members 18.

As shown in FIGS. 2 and 3, improved fastener 10 releasably couples side panel member 16 having opposing internal and external surfaces 26 and 28 to display panel member 18. Side panel members 16 include through openings 24 of a predetermined contour to allow passage of improved fastener 10 therethrough in a manner to be described in following paragraphs.

Referring in particular to FIGS. 1 and 3, improved fastener 10 includes fastener base portion 30, fastener central portion 32, and arm members 34 and 36 extending in longitudinal direction 12. Base portion 30 defines lug member upper section 38 extending beyond the boundary of side panel through opening 24 when improved fastener 10 operatively engages side panel 16 and display panel member 18. As can be seen, lug member upper section 38 contiguously interfaces with external surface 28 of side panel member 16. Structural engagement of lug member upper section 38 with external surface 28 provides for a shoulder type engagement which substantially lockingly engages improved fastener 10 to side panel 16 when display panel member 18 is coupled thereto, as is shown in FIG. 3.

As shown in FIG. 3, base portion 30 includes base portion chamfered lower surface or section 40 for insert of improved fastener 10 through side panel member through opening 24 in reversible longitudinal direction 12. Thus, although base portion lug member upper section 38 extends beyond the contour of through opening 24, it is clearly seen that by tilting improved fastener 10, such fastener 10 may be inserted from internal display system 14 or external display system 14.

As shown in FIG. 3, fastener central portion 32 has a predetermined contour for matingly engaging a portion of inner wall 42 of panel member through openings 24. Contiguous mating of at least a portion of central portion 32 with internal walls 42 is an important concept in order that there be no extreme tolerances between the dimension of central portion 32 and openings 24 to minimize displacement of improved fastener 10 when in a structurally coupled mode as shown in FIGS. 2 and 3. Thus, for at least a portion of the peripheral surface of central portion 32, there may be frictional engagement between inner wall 42 and a portion of the peripheral surface of fastener central portion 32.

Fastener central portion 32 includes central portion chamfered lower section 44 as shown in FIG. 3. At least a portion of chamfered lower section 44 must be in contact with inner wall 42 to provide stabilization of improved fastener 10 when such is structurally coupling side panel members 16 and display panel members 18.

Base portion chamfered lower section 40 and central portion chamfered lower section 44 may define an inclined chamfer surface which are aligned and coincident each with respect to the other. The inclined chamfer surface formed by sections 40 and 44 defines an incline surface angle within an approximating range of 20.0° to 30.0° when taken with respect to a horizontal plane as defined by the plane of display panel member 18 shown in FIG. 3. The particular inclination angles of coincident surfaces 40 and 44 are not overly important to the inventive concept as herein described, with the exception that at least a portion of lower section 44 contact and matingly engage a portion of internal wall 42 of opening 24 in order to provide stabilization as previously described for improved fastener 10.

Improved fastener 10 further includes a pair of longitudinally extending arm members 34 and 36 which are fixed to fastener central portion 32 and as is clearly seen in FIG. 3, adapted to clampingly engage display panel members 18 on opposing surfaces 46 and 48. Lower arm member 36 extends substantially normal to a plane defining side panel member 16. Lower arm member 36 includes upper surface 50 which contiguously interfaces with a portion of panel member lower surface 48. In general, upper surface 50 of arm member 36 as well as lower surface 48 of panel member 18 are planar in contour to provide a load bearing surface interface to provide structural integrity for display system 14.

Upper arm member 34 extends in longitudinal direction 12 and is inclined with respect to the plane of side panel member 16 and a horizontal plane defined by display panel member 18 and in particular, panel member surface 46. The combination of upper and lower arm members 34 and 36 form inclined insert passageway 52 having a longitudinally directed planar lower surface 50 for slidable insert of display panel member 18 in a substantially horizontal plane, as shown in FIG. 3. In general, inclined insert passageway 52 has a width opening less than the width of display panel member 18 at least throughout a portion of the longitudinal extension of arm members 34 and 36. Obviously, the concept of having insert passageway 52 with a width less than the width of display panel member 18 throughout a portion thereof allows for flexing of upper arm member 34 in order to provide at least a snap fit type insert as will be shown in following paragraphs.

The component portions of improved fastener 10 may be formed of a plastic like material composition such as Lexan or some like material composition. However, such plastic material compositions are flexible to a predetermined extent and allow for the bifurcated arms 34 and 36 to be resiliently displaced upon insertion over and under display panel member 18. The inclination of upper arm member 34 and lower arm member 36 with respect to the horizontal plane defined by surfaces 46 and 48 has an angular inclination within an approximating range of 10.0°-15.0°. In order to insure positive contact and coupling of improved fastener 10 to display panel members 18, upper arm member 34 includes extension member or pin member 54 for insert into through opening 56 as shown in FIG. 3. It is to be understood that through opening 56 may be a recess or other type opening in panel member 18 and in this manner, improved fastener 10 snaps into through opening 56 in order to achieve a positive locking effect with respect to panel member 18.

Extension member 54 may be formed in the geometrical contour of an inclined truncated cylinder as is seen in FIG. 1. In this case, there is provided extension member inclined surface 58 which allows for a positive camming effect as upper arm member 34 is resiliently displaced upon insertion of improved fastener 10 over panel members 18. Further, the vertically directed surface of extension member 54 provides for a locking interface with the sidewalls of through opening 56, as is shown in FIG. 3.

Due to the fact that improved fastener 10 is slidingly interfit with panel members 18 in an interference type operation with flexible displacement of upper arm member 34 and lower arm member 36, necessary for an insert construction, there is included chamfer 60 formed on a frontal portion of lower arm member 36 to provide a further ease of insertion in the coupling of improved fastener 10 to display panel member 18.

Improved fastener 10 as has been stated and described in previous paragraphs, is formed of base portion 30, central portion 32, and upper and lower arm members 34 and 36, respectively. Improved fastener 10 may be formed in a one-piece formation by molding, or some like technique. In particular, a commercially viable improved fastener 10 has been manufactured where improved fastener 10 is formed of a plastic material composition such as Lexan. In this manner and mode of manufacture, improved fastener 10 has been easily manufactured and includes a low manufacturing cost when molded.

Central portion 30 further includes through opening 62 passing in a direction substantially normal longitudinal direction 12 and is provided in order to allow a substantially constant wall thickness of central portion 32. Through opening 62 defines an elongated slot and is advantageous in that the molding of central portion 32 when using a plastic material composition has been found to produce air or gas bubbles which have a deleterious effect on the structural integrity of improved fastener 10. By providing through opening 62, it has been found that even with the lessening of material used in the formation of improved fastener 10, that the structural integrity of improved fastener 10 is sufficient to maintain panel members 18 in a releasable coupling mode of operation with high structural integrity. In general, the formation of through opening 62 in the manner described provides for a substantially constant wall thickness of fastener central portion 32.

In the use shown in FIG. 2 for improved fastener 10, display panel members 18 and display side panel members 16 are substantially planar in contour when such are in releasably coupled relation each to the other such that substantially orthogonal relationships exist each with respect to the other.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. An improved fastener for releasably coupling a side panel member having opposing internal and external surfaces to a display panel member, said side panel member having a side panel member through opening of predetermined contour formed therethrough, said improved fastener comprising:

a base portion defining a lug member upper section extending beyond said side panel through opening contour when said fastener operatively engages said side panel and display panel members, said lug member upper section contiguously interfacing with said external surface of said side panel member, said base portion having a chamfered lower section for insert of said fastener through said side panel member through opening in a reversible longitudinal direction, a central portion of said fastener secured to said base portion, at least a portion of said fastener central portion having a predetermined contour for matingly engaging a portion of an inner wall of said panel member through opening, and a pair of longitudinally extending arm members fixedly mounted to said fastener central portion and adapted to clampingly engage said display panel member on opposing surfaces thereof, one of said longitudinally extending arm members extending substantially normal a plane defining said side panel member, the other of said longitudinally extending arm members being inclined with respect to said plane of said side panel member defining an inclined display panel member insert passageway having a longitudinally directed planar lower surface for slidable insert of said display panel member in a substantially horizontal plane, said arm members being longitudinally reversibly insertable through said through opening of said side panel for slidable insert on said display panel member.

2. The improved fastener as recited in claim 1 where said central portion includes a chamfered lower section.

3. The improved fastener as recited in claim 2 where said base portion chamfered lower section and said central portion chamfered lower section define an inclined chamfer surface.

4. The improved fastener as recited in claim 3 where said inclined chamfer surface defines an inclined surface angle within the approximate range of 20.0° to 30.0° when taken with respect to said horizontal plane.

5. The improved fastener as recited in claim 1 where said display panel insert passageway has a width less than a width of said display panel member throughout a portion of said longitudinal extension of said arm members.

6. The improved fastener as recited in claim 1 where one of said arm members is inclined with respect to the other of said arm members by an angular inclination within an approximating range of 10.0°–15.0°.

7. The improved fastener as recited in claim 1 where at least one of said arm members includes an extension member for insert into a recess formed in said display panel member.

8. The improved fastener as recited in claim 7 where said extension member includes a geometrical contour of an inclined truncated cylinder.

9. The improved fastener as recited in claim 1 where at least one of said arm members includes an extension member for insert into a through opening formed through said display panel member.

10. The improved fastener as recited in claim 1 where said through opening of said side panel is circular in contour.

11. The improved fastener as recited in claim 1 where said improved fastener base portion, central portion, and said arm members are formed in one-piece formation.

12. The improved fastener as recited in claim 11 where said improved fastener base portion, central portion, and said arm members are formed of a plastic material composition.

13. The improved fastener as recited in claim 12 where said improved fastener base portion, central portion, and said arm members are molded in one-piece formation.

14. The improved fastener as recited in claim 1 where said base portion lug member upper section lockingly engages said external surface of said side panel member when said display panel member is inserted within said display panel member insert passageway.

15. The improved fastener as recited in claim 1 where said base portion lug member upper section and said central portion form a shoulder for contiguous interface with said inner wall of said panel member through opening and said external surface of said side panel member.

16. The improved fastener as recited in claim 1 where said central portion includes an elongated through opening formed therethrough passing substantially normal said longitudinal extension of said arm members.

17. The improved fastener as recited in claim 16 where said elongated through opening is dimensionally sized to provide a substantially constant wall thickness of said improved fastener central portion.

18. The improved fastener as recited in claim 1 where said side panel member and said display panel member are substantially planar in contour.

19. The improved fastener as recited in claim 1 where said side panel member and said display panel member are releasably coupled each to the other in substantially orthogonal relation.

* * * * *